May 1, 1956

J. E. SNYDER ET AL 2,743,761

HEAT SEALER

Filed Oct. 20, 1953

INVENTOR.
JAMES E. SNYDER
BY CLARENCE M. CARSON

ATTORNEY

United States Patent Office 2,743,761
Patented May 1, 1956

2,743,761
HEAT SEALER

James E. Snyder, Akron, Ohio, and Clarence M. Carson, Lakeland, Fla., assignors, by mesne assignments, to The Goodyear Tire & Rubber Company, a corporation of Ohio Application October 20, 1953, Serial No. 387,238

5 Claims. (Cl. 154—42)

This invention relates to a device for sealing together two or more sheets of heat-sealable film by applying heat and pressure thereto. Films which may be sealed in this manner include films of rubber hydrochloride, polyethylene, copolymers of vinyl chloride with such monomers as vinyl acetate, ethyl chloromaleate and vinylidene chloride, also mixtures of polyvinyl chloride and butadiene-acrylonitrile rubber, etc.

Most heat-sealing devices consist of two metal jaws, one or both being electrically heated. The films to be sealed are placed between the jaws which are then brought together with sufficient pressure to form the seal. If only one jaw is heated, the other jaw need not be of metal, but may be of a semi-rigid material such as glass fabric, cotton duck, or a sheet material known as Teflon (polytetrafluoroethylene) cemented to metal or the like. One difficulty in producing heat seals is the tendency of the films to thin out where the pressure is applied, as when two rectangular bars are closed on the film. This weakens and at times even tears the film at the edge of the seal.

Another difficulty encountered with metal jaws is the adherence of the film to the metal after the seal has been made. This necessitates interruption of the heat-sealing operation and there is the ever-present possibility of damage to the film.

According to this invention one or preferably both jaws of a heat-sealing device are formed of metal and are surfaced wholly or in part with a heat-conducting resilient material. The preferred surfacing material is natural or synthetic rubber which has been compounded to increase its heat conductivity. This resilient material is cemented or otherwise attached to the metal which is heated electrically or by other means. The resilient material may be rubber properly compounded. Heat-conducting rubber is well-known in the industry. Compounding ingredients which increase its heat conductivity include carbon black, zinc oxide, titanium oxide, magnesium oxide, and metal powders such as aluminum flake, etc. Other heat-conducting resilient materials include the so-called silastic which is a synthetic material made from silicon tetrachloride. Its heat conductivity is due largely to the presence of zinc oxide or other inorganic filler with which it is commonly compounded.

The heat-conducting material has a heat transfer rate of at least 1.40 B. t. u./hour/square foot/degree F./inch, and its composition should have a Shore hardness of substantially 50 to 100. Softer material is not satisfactory for applying the required pressure, and harder material is apt to damage the film.

One or both of the jaws of the heat-sealing device of this invention are covered or partly covered with some such heat-conducting resilient material with a Shore hardness of approximately 50 to 100. Under this heat-conducting material, in most of the heat-sealing devices of this invention is located the metal (or other heat conductor), although the heat-generating unit may be located directly under the resilient covering or the current may be supplied directly to it. Various adaptations of the device are shown in the accompanying drawings which also illustrate the type of seal produced.

Figure 1:
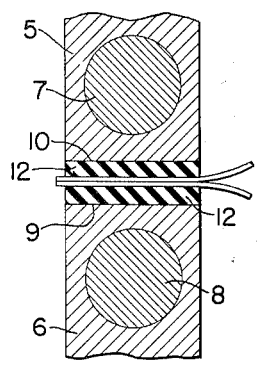
Fig. 1 is a section through a heat-sealing device composed of two metal bars, the heat-sealing surfaces of which are covered entirely with heat-conducting resilient material.

In Fig. 1 the upper jaw 5 and the lower jaw 6 are both made of heat-conducting metal. The heat is supplied from heaters located in the openings 7 and 8. These heaters are usually electrical resistances, but steam or the like may be used. The surfaces 9 and 10 are both completely covered by sheets of heat-conducting resilient material 12 which may be 1/16 inch to 1/4 inch thick, more or less, but is preferably about 3/32 inch thick. The following formulae are illustrative of formulae which may be employed for producing the resilient material.

Example 1

| | Parts |
|---|---|
| Neoprene | 100 |
| Carbon black | 50 |
| Stearic acid | 0.5 |
| Di-o-tolyguanidine salt of dicatechol borate (Permalux) | 0.5 |
| Zinc oxide | 5 |
| Magnesium oxide | 10 |
| Hydrated calcium silicate | 15 |

This stock after curing has a Shore hardness of 85 and a heat transfer rate of 1.50 B. t. u./hour/square foot/degree F./inch.

Example 2

| | Parts |
|---|---|
| Butadiene-acrylonitrile | 100 |
| Carbon black | 50 |
| Zinc oxide | 5 |
| Benzothiazyl disulfide | 1.25 |
| Sulfur | 1.25 |
| Stearic acid | 0.5 |

This stock after curing has a Shore hardness of 85 and a heat transfer rate of 1.40–1.50 B. t. u./hour/square foot/degree F./ inch.

Example 3

If, in the formula of Example 2, the amount of heat-conductive black is increased to 100 parts and softeners, such as rubber process oil, are added to maintain a hardness figure of 85, the heat conductivity is increased to 1.90 B. t. u. Such resilient material is satisfactory.

*Example 4*

Silastic rubber (whose formula is a trade secret) which has a Shore hardness of 45–55 and a density of 1.9 has a heat transfer rate of 2.59 B. t. u. and may be used.

The material of any one of the above formulae is sheeted out, cured, and adhered to the metal in any satisfactory manner.

Figure 2:
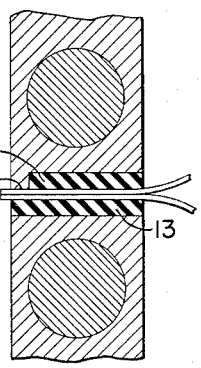
Fig. 2 shows a similar device but with the upper jaw not completely covered with the resilient material, one edge of the jaw being exposed.

The device of Fig. 2 is similar to that illustrated in Fig. 1. However, along one edge of the upper plate the metal surface 15 is exposed and forms a part of the sealing surface. It is brought into contact with the upper film during the sealing operation.

Figure 5:
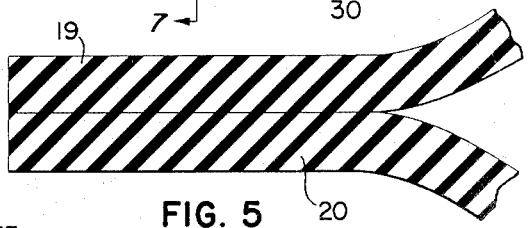
Fig. 5 illustrates a section through two films which have been placed together before sealing.
Figure 6:
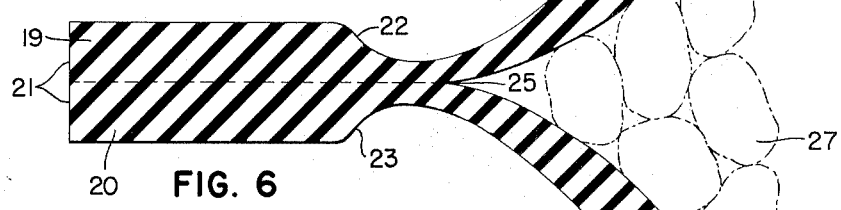
Fig. 6 illustrates a section through these two films after they have been sealed together by present standard equipment into a bag, the illustration including contents of the bag in dotted lines.
Figure 7:
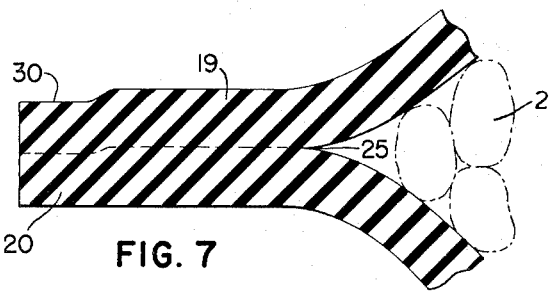
Fig. 7 is a section through a section on the line 7—7 of Fig. 8, of a bag formed of the same two films which have been sealed together at the bottom by the device illustrated in Fig. 2.

The advantages of using a resilient heat-producing surface for pressure on the film are illustrated in Figs. 5–7 which show sections through the two films before and after being sealed together at the bottom of a bag. Figure 5 illustrates the two films 19 and 20 brought together before sealing.

Figure 6 is a section through these films after being sealed by the pressure of two metal bars. The films 19 and 20 are flush at the outside edge 21 or bottom of the bag. The exaggerated contours of the film at 22 and 23, where metal sealing bars with rounded edges have contacted the film show the effect of pinching at the inner edge of the seal. The cause of the thinning effect may be imperfect alignment of the heater jaws, vibration of the jaws or local overheating at the edge of the jaws. The films are sealed up to the line 25 (which is shown as a point). If bars rectangular in section were employed, the depressions in the film at the inner edge of the seal would be more sharply depressed.

Figure 6 illustrates pieces of the packaged material at 27 which may be popcorn, peanuts, candy, or any other material. The packaged material may be of fine or coarse grain, or a liquid. The film has been thinned down during sealing. Such thinning weakens the film very decidedly along the edge of the seal at the line 25, particularly where the film along this line is subjected to repeated flexing which is the case when a package filled as illustrated is shipped.

Figure 7 illustrates a seal made with the same two films 19 and 20. It is a section on the line 7—7 of the bag illustrated in Fig. 8. The films along the line 25 which marks the inner edge of the seal are of substantially the same thickness as the unsealed films (Fig. 5) and therefore are at their maximum strength. At the outer edge of the seal where the metal surface 15 (Fig. 2) has contacted the upper film there is a depression 30, but this depression is relatively narrow and has no effect on the strength of the film along the line 25. The exposed metal edge of the sealer bar 15 (Fig. 2) conducts more heat to the edge of the seal 30 (Fig. 7), thereby effecting a leak-proof weld at the outer edge of the seal. There is no appreciable thinning of the films from the inner edge of the depression 30 to a point immediately above the line 25 where it has been contacted by the resilient coverings 13 on the surfaces of the metal bars. The resilient surfaces do not make as strong a seal as the metal bars, but by applying pressure and extra heat with the outer metal edge 15 of the upper bar, a tight seal is formed at the outer edge of the films equivalent to the seal produced by the pressure of two metal bars.

Figure 8:
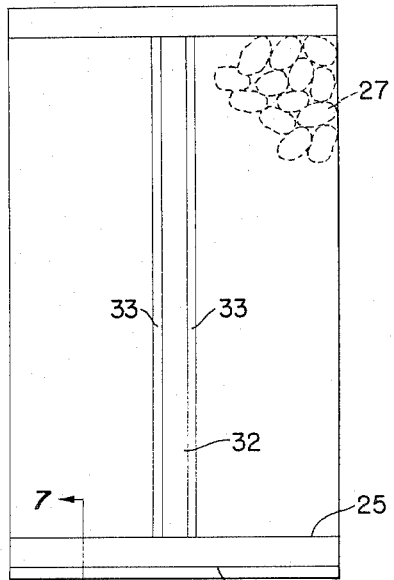
Fig. 8 is a plan view of a bag the longitudinal seam of which has been made with the sealing device of Fig. 4 and the bottom seam of which has been made with the sealing device of Fig. 2.
Figure 4:
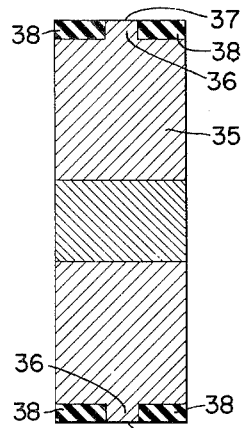
Fig. 4 illustrates a section through a metal heat-sealing roller with the metal exposed at the center of the surface thereof; and resilient material on both sides of this exposed center.

The roller of Fig. 4 is designed particularly for forming the longitudinal seal or seam in a tube of a single ply of film which is eventually to be cut to lengths for the manufacture of bags. Figure 8 illustrates such a seal with the strongly sealed depressed area 32 flanked by the weakly sealed areas 33. A roller may be used for producing such a seal. It may be operated manually or by machinery. The roller is pressed down on the outer or exposed upper surface of the two films, and they are supported above the opposite wall of the bag by a mandrel or the like so that the two walls are not sealed together.

The roller of Fig. 4 is formed of the annular metal member 35 from which the metal flange 36 extends throughout its circumference, the surface 37 of the flange being adapted to press against the film. The flange is flanked on both sides by the heat-conducting resilient material 38. The surface 37 forms a depression 32 (Fig. 8) in the top surface of the upper film (comparable to the depression 30 of Fig. 7 formed by the metal edge of the upper plate of the device illustrated in Fig. 2), but there is little, if any, depression of the film throughout the adjacent areas 33 of the seal contacted by the resilient materials 38.

Figure 3:
Fig. 3 illustrates a heat-sealing device with its metal upper jaw exposed along the center, with resilient material on each side of this center area.

Figure 3 illustrates another device for forming a seal which is not an edge seal. It may be used, for example, in sealing the longitudinal seam of a short length of tube which is to be used for the manufacture of bags. The upper jaw 40 is formed of metal and any suitable type of heater is located in the opening 41. There is a narrow projection of metal 42 at the middle of the bottom of the jaw and this is flanked on both sides by the pads 43 of heat-conducting resilient material. The upper jaw 40 is mounted so as to reciprocate vertically and apply pressure to the stationary lower support 45. This supporting element may be a thin covering of cotton duck or Teflon, neither of which has a very high coefficient of heat conductivity. The support 45, in any event, is on the stationary table 46. The two films 47 and 48 are placed on the pad when the upper jaw 40 is raised. When the jaw 40 is lowered and pressure is applied, the two films are sealed together. There is a slight depression in the surface of the upper film where it has been contacted by the projection 42. On the two sides of the depression where the resilient materials 43 contact the upper surface of the film there is no appreciable depression. A strong seal is assured where the upper surface is depressed, and the films are sealed together on both sides of this so that there can be no flexing of the individual films at the depression.

Alternately the table 46 may be heated and the pad 45 may be of any heat-conducting resilient material. The table may be reciprocated, but that would not be usual with the particular structure shown in Fig. 3.

Thus the design of one or both of the jaws which supply heat to the seal may be varied depending upon the operation which is to be carried out. The films ordinarily do not adhere to such heat-conducting material as mentioned and there is, therefore, less danger of the films being damaged during the operation than where the films contact large areas of hot metal.

The invention is defined in the claims which follow.

What we claim is:

1. A heat-sealing device which includes a jaw of heat-conducting metal with means for supplying heat thereto, with the pressure surface of the jaw covered, at least in part with heat-conducting resilient material which is an integral part of the jaw, said heat-conducting resilient material having a heat transfer rate of at least 1.40 B. t. u./hour/square foot/degree F./inch.

2. A heat-sealing device which includes a jaw of heat-conducting metal with means for supplying heat thereto, the pressure surface of the jaw being in part exposed for pressure contact with the material being sealed, and adjacent said part a depression in which is heat-conducting resilient material the exposed surface of which is in substantially the same plane as said exposed metal surface, said heat-conducting resilient material having a heat transfer rate of at least 1.40 B. t. u./hour/square foot/degree F./inch.

3. A heat-sealing device with a jaw the pressure surface of which along one edge is formed of heat-conducting metal, the balance of the pressure surface of the jaw being formed of heat-conducting resilient material the pressure surface of which is in substantially the same plane as the pressure surface of said metal.

4. A heat-sealing device with a jaw the pressure surface of which at about the center and extending from one end thereof to the other is formed of heat-conducting metal, the balance of the pressure surface of the jaw being formed of heat-conducting resilient material the pressure surface of which is in substantially the same plane as the pressure surface of said metal, said heat-conducting resilient material having a heat transfer rate of at least 1.40 B. t. u./hour/square foot/degree F./inch.

5. A heat-sealing roller with a cylindrical pressure surface, which roller includes heating means located centrally thereof, the central portion of said cylindrical surface being formed of heat-conducting metal, the balance of the cylindrical surface being formed of heat-conducting resilient material, said heat-conducting resilient material having a heat transfer rate of at least 1.40 B. t. u./hour/square foot/degree F./inch.

References Cited in the file of this patent

UNITED STATES PATENTS

| | | |
|---|---|---|
| 2,433,176 | Van Epps et al. | Dec. 23, 1947 |
| 2,479,375 | Langer | Aug. 16, 1949 |
| 2,517,672 | Jenkins | Aug. 8, 1950 |
| 2,525,356 | Hoyler | Oct. 10, 1950 |
| 2,556,452 | Spalding | June 12, 1951 |
| 2,574,094 | Fener et al. | Nov. 6, 1951 |
| 2,579,063 | Andrews | Dec. 18, 1951 |
| 2,589,756 | Waters | Mar. 18, 1952 |